United States Patent [19]

Westerberg

[11] Patent Number: 5,022,469
[45] Date of Patent: Jun. 11, 1991

[54] EXHAUST MEANS FOR PNEUMATIC POWER TOOL

[75] Inventor: Sven P. J. Westerberg, Saltsjöbaden, Sweden

[73] Assignee: Atlas Copco Tools Aktiebolag, Stockholm, Sweden

[21] Appl. No.: 461,403

[22] Filed: Jan. 5, 1990

[30] Foreign Application Priority Data

Jan. 16, 1989 [SE] Sweden .................... 8900137

[51] Int. Cl.$^5$ .................................... B23B 45/00
[52] U.S. Cl. ........................ 173/170; 173/DIG. 2; 181/230; 181/255; 181/256
[58] Field of Search ................ 173/171, 170, DIG. 2; 181/230, 254, 238, 255, 256

[56] References Cited

U.S. PATENT DOCUMENTS

| | | | |
|---|---|---|---|
| 4,407,390 | 10/1983 | LeBlanc, Jr. | 173/DIG. 2 X |
| 4,673,042 | 6/1987 | Steiner | 173/DIG. 2 X |
| 4,739,837 | 4/1988 | Maslakov et al. | 173/DIG. 2 X |
| 4,778,015 | 10/1988 | Jacobsson | 173/DIG. 2 X |

Primary Examiner—P. W. Echols
Assistant Examiner—Willmon Fridie, Jr.
Attorney, Agent, or Firm—Frishauf, Holtz, Goodman & Woodward

[57] ABSTRACT

A sound depressing exhaust means for a pneumatic power tool with a substantially cylindrical housing (10) and a vane motor (11) with exhaust port means (23), has an annular casing (41) surrounding a portion of the housing (10), and four expansion chambers (31-32, 34, 36, 39) arranged in series and combined with four flow restrictions (33, 37, 30, 35) and a sound trap (38). All of the expansion chambers are annular and located concentrically relative to the tool housing (10), and one of the flow restrictions has an annular screen (37) separating two of these chambers (34, 36). The last two of the expansion chambers (36, 39) in the exhaust flow direction contain high frequency absorbing elements (43, 44) of foamed plastic.

5 Claims, 1 Drawing Sheet

U.S. Patent
June 11, 1991
5,022,469
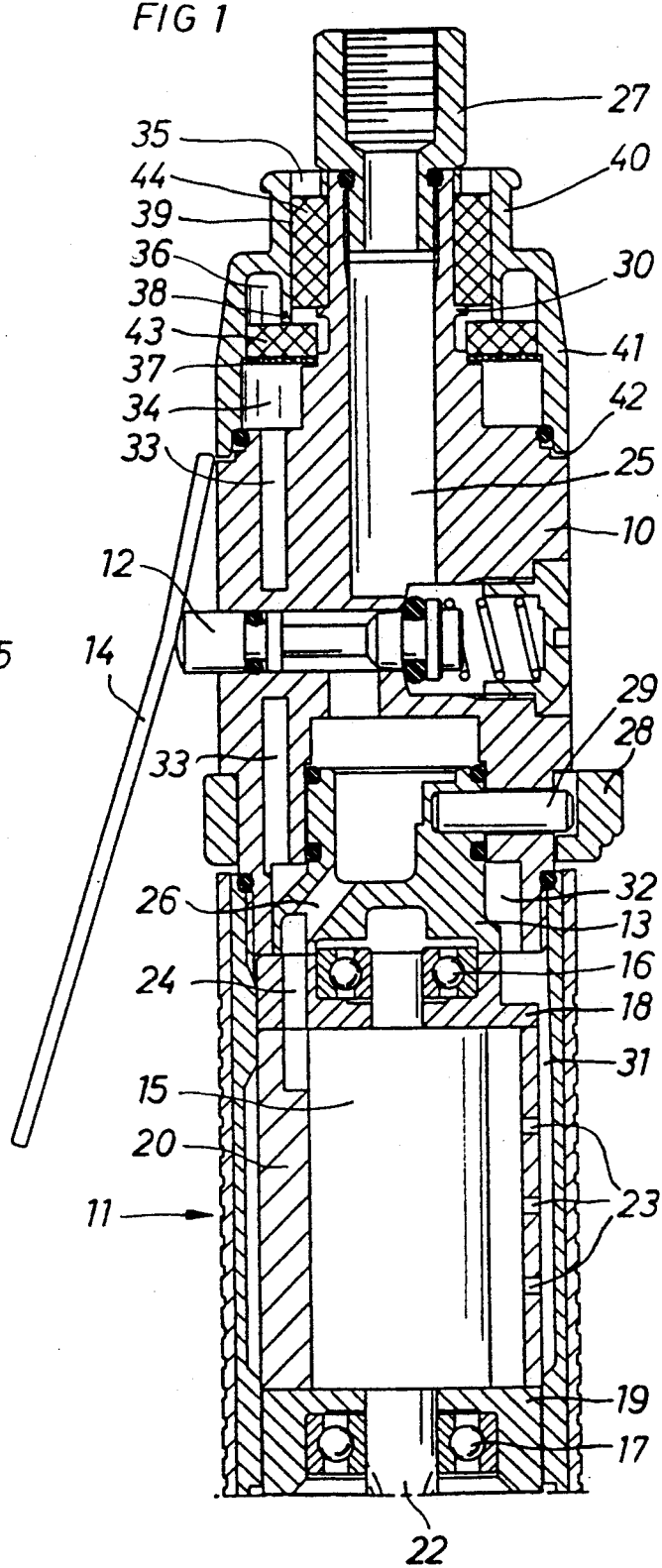
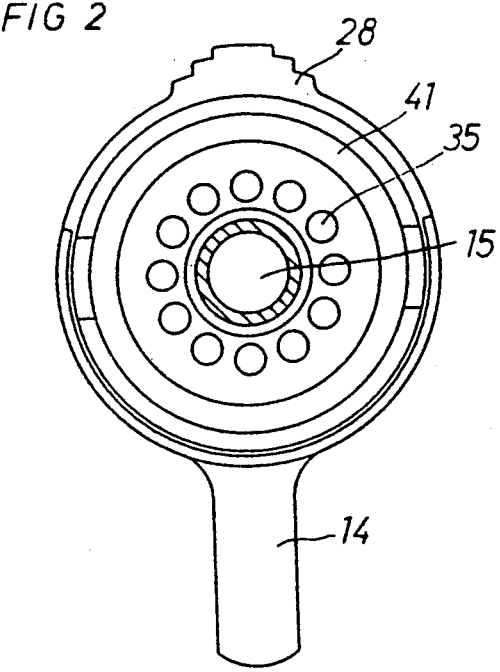

EXHAUST MEANS FOR PNEUMATIC POWER TOOL

BACKGROUND OF THE INVENTION

This invention relates to an exhaust means for a pneumatic power tool, and more particularly to a sound depressing exhaust means for such a tool.

The main object of the invention is to provide an improved exhaust sound depressing means by combining expansion volumes with successive flow restrictions and a labyrinth type sound trap.

A preferred embodiment of the invention is hereinbelow described in detail with reference to the accompanying drawing.

BRIEF DESCRIPTION OF THE DRAWINGS

FIG. 1 shows a longitudinal section through the rear portion of a pneumatic power tool according to the present invention.

FIG. 2 shows a rear end view of the power tool.

DETAILED DESCRIPTION

The tool shown in the drawing figures comprises a cylindrical housing 10, a vane motor 11, a motive pressure air inlet valve 12, a pivotable handle 14 for activating the latter and a reverse valve 13.

The vane motor 11 comprises a rotor 15 journalled in ball bearings 16, 17 mounted in two opposite end walls 18, 19, a cylinder 20, and an output shaft 22. The output shaft 22 is coupled to a working implement, for example a nut socket, via a reduction gearing (not shown). The cylinder 20 is provided with exhaust openings 23, and the upper end wall 18 is provided an air inlet opening 24. The latter communicates with a pressure air supply passage 25 via a distribution passage 26 in the reverse valve 13. A threaded socket 27 is fitted to connect the tool to a pressure air conduit.

The end wall 18 comprises a second, non-illustrated air inlet opening for air supply to the motor at reverse rotation, and the reverse valve 13 is arranged to be rotated between a "forward" position and a "reverse" position. For accomplishing such rotation, there is provided a rotatable manoeuver ring 28 on the outside of the tool housing 10, which ring 28 is coupled to the reverse valve 13 by means of a radial pin 29.

The exhaust air path through the tool comprises at its upstream end an expansion chamber 31 located outside the cylinder 20 and extending into a second chamber 32 which surrounds the forward part of the reverse valve 13. A longitudinal passage 33 connects chamber 32 to an annular chamber 34 which in turn communicates with another annular chamber 36 via a flow restricting perforated screen 37. Into the chamber 36 there extends a tube shaped collar 38 which forms the entrance portion of an annular outlet passage 39. The latter comprises at its downstream end a number of outlet openings 35. See FIG. 2. In the entrance portion 38 of the outlet passage 39 there is a small annular flange 30. The latter extends radially from the housing 10 and forms together with the tubular collar 38 another flow restriction.

The chambers 34 and 36 and the outlet passage 39 are formed between the rear portion of the tool housing 10 and a casing 41. The latter is clamped axially against a shoulder 42 on the housing 10 by means of the conduit connection socket 27.

At its rear end, the casing 41 is formed with a cylindrical neck portion 40 for connection of a non-illustrated exhaust hose in a concentric disposition relative to the pressure air supply conduit.

In the chamber 36, there is mounted a sound absorbing ring 43 of foamed plastic. The latter is clamped between the tube shaped collar 38 and the screen 37. A foam plastic sound absorbing ring 44 is also located in the outlet passage 39.

During operation of the tool, pressure air is supplied to the vane motor 11 through connection socket 27, inlet passage 25, inlet valve 12, distribution passage 26 of the reverse valve 13 and inlet opening 24 in the rear end wall 18.

Exhaust air leaves the motor 11 through the openings 23 in the cylinder 20, thereby expanding into the chamber 31 and further into the chamber 32. From here on, the exhaust air has to pass through the flow restricting passage 33 to reach the second expansion chamber 34. The moderate pressure drop accomplished by the passage 33 serves to suppress resonances.

From chamber 34 to chamber 36 the exhaust air flow has to pass the screen 37 which is arranged to accomplish a substantial pressure drop. By this flow restriction the main damping effect is obtained as regards the noise caused by the vanes of the motor. Although the vane noise, which is of a relatively low frequency, is muffled to a large extent by the screen 37, there is created a high frequency noise due to the high flow velocity of the air through the screen 37. The main part of that high frequency noise is absorbed by the foam plastic ring 43.

The sound still left in the exhaust flow downstream of the absorbing ring 43 has two ways to propagate, namely directly to the outlet passage 39 through the restriction entrance of the latter or into the outer part of the annular chamber 36. That part of the sound waves that propagates into the outer part of chamber 36, i.e. outside of the tube shaped collar 38, is reflected back towards the absorbing ring 43. A certain part of these reflected sound waves is reflected back into chamber 36, whereas the rest of them propagates through the absorbing material of ring 43 and into the outlet passage 39. These reflections cause a phase lag in the sound wave propagation, which contributes to a good damping effect.

As described above, the tube shaped collar 38 and the flange 30 form a flow restriction, and the foam plastic element 44 located in the outlet passage 39 is effective to accomplish a final damping of the high frequency noise emanating from that restriction.

Finally, the exhaust air leaves the machine through the outlet openings 35 which create a smaller pressure drop, small enough not to cause any high frequency blow noise.

Following the exhaust flow path through the machine, one can identify a number of expansion chambers each succeeded by a flow restricting means which in combination with a sound trap form a very effective exhaust noise depressing means.

I claim:

1. Sound depressing exhaust means for a pneumatic power tool having a substantially cylindrical housing (10) having a longitudinal axis, and a vane motor (11) which is disposed within said housing (10) and which has an exhaust port means (23) for expelling exhaust from the vane motor (11), the sound depressing exhaust means comprising:

an annular casing (41) surrounding a portion of said housing (10);

at least first, second and third expansion chambers (31-32, 34, 36) arranged in series with said exhaust port means (23) and being arranged in series in the downstream direction of exhaust flow relative to said exhaust port means (23), and said expansion chambers (31-32, 34, 36) communicating with said exhaust port means (23), one of said expansion chambers (36) being a last expansion chamber in the direction of said exhaust flow;

wherein said third expausion chamber in the down steam exhaust flow direction contains a high frequency sound absorbing element therein at least two exhaust flow restrictions (37, 30) each communicating with and following in the downstream direction of said exhaust flow, one of said expansion chambers; and an outlet passage means (39) comprising a tube shaped entrance portion (38) extending in the axial direction of said substantially cylindrical housing (10) and said tube shaped entrance portion extending into said last one (36) of said expansion chambers, for thereby forming a sound trap.

2. The sound depressing exhaust means of claim 1, wherein:
all of said expansion chambers are annular and are located in a substantially concentric relation to said substantially cylindrical housing (10); and
said tube shaped entrace portion (38) has a substantially circular cross section and comprise a wall portion which is located concentrically in relation to said last one (36) of said expansion chambers.

3. The exhaust means of claim 2, further comprising a fourth expansion chamber (39) arranged in series with said first, second and third expansion chambers in the downstream exhaust flow direction, said fourth expansion chamber being formed by said outlet passage means (39) and containing a high frequency sound absorbing element (44) therein.

4. The exhaust means of claim 1, further comprising a fourth expansion chamber (39) arranged in series with said first, second and third expansion chambers in the downstream exhaust flow direction, said fourth expansion chamber being formed by said outlet passage means (39) and containing a high frequency sound absorbing element (44) therein.

5. The exhaust means of claim 1, wherein at least one other of said expansion chambers contains a high frequency sound absorbing element (43, 44) therein.

* * * * *